United States Patent
Huenink et al.

(10) Patent No.: US 11,796,150 B2
(45) Date of Patent: Oct. 24, 2023

(54) RGB LED SIGNAL LIGHTS

(71) Applicant: DEERE & COMPANY, Moline, IL (US)

(72) Inventors: Brian M. Huenink, Cedar Grove, WI (US); Nathan R. Demski, Durango, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/115,372

(22) Filed: Feb. 28, 2023

(65) Prior Publication Data
US 2023/0243481 A1    Aug. 3, 2023

Related U.S. Application Data (63) Continuation of application No. 17/325,428, filed on May 20, 2021.

(51) Int. Cl.
*F21S 43/14*    (2018.01)
*F21V 23/00*    (2015.01)
(Continued)

(52) U.S. Cl.
CPC .............. *F21S 43/14* (2018.01); *F21S 43/26* (2018.01); *F21V 23/003* (2013.01);
(Continued)

(58) Field of Classification Search
CPC ........................... F21V 23/0435; F21V 23/003
See application file for complete search history.

(56) References Cited

U.S. PATENT DOCUMENTS 8,816,586 B2    8/2014    Marcove et al.
10,562,440 B1 *    2/2020    Julian .................... H05B 45/00
(Continued)

FOREIGN PATENT DOCUMENTS

CN    1439548 A    9/2003
DE    112012002240 T5    4/2014
(Continued)

OTHER PUBLICATIONS

John Deere, 1995 John Deere 8400 Row Crop Tractor, 1995, https://www.atlantictractor.net/reman (Year: 1995).*
(Continued)

*Primary Examiner* — Eric T Eide
(74) *Attorney, Agent, or Firm* — Taft Stettinius & Hollister LLP; Stephen F. Rost (57) ABSTRACT

A vehicle lighting fixture and system where the fixture includes light emitting diodes (LEDs) and a lens. A controller monitors vehicle conditions and sends lighting commands to activate one or more LEDs based on the vehicle conditions. The LEDs can be red-green-blue (RGB) LEDs capable of emitting various different colors. The lighting commands can include illumination color, intensity level and on/off. The LEDs can be arranged in groups, where each group is separated from the other groups. The lighting commands can include a blink/steady designation, where blink causes the group to blink in the illumination color, and steady causes the group to steadily light in the illumination color. A blink frequency can control the blink rate in the illumination color. The lighting commands can include an intensity level; where when a group is activated it is illuminated in the illumination color at the intensity level.

20 Claims, 6 Drawing Sheets

(51) Int. Cl.
  *F21S 43/20*    (2018.01)
  *F21V 23/04*    (2006.01)
  *F21W 107/10*   (2018.01)
  *F21Y 115/10*   (2016.01)
  *F21Y 113/10*   (2016.01)

(52) U.S. Cl.
  CPC ..... *F21V 23/0435* (2013.01); *F21W 2107/10* (2018.01); *F21Y 2113/10* (2016.08); *F21Y 2115/10* (2016.08)

(56) References Cited

U.S. PATENT DOCUMENTS

| | | |
|---|---|---|
| 10,576,881 B2 | 3/2020 | Dubey et al. |
| 10,617,054 B2 * | 4/2020 | Gresch ............... A01B 63/111 |
| 2012/0299476 A1 * | 11/2012 | Roberts ............ B60Q 1/2607 |
| | | 315/77 |
| 2017/0368982 A1 | 12/2017 | Dellock et al. |
| 2020/0224847 A1 * | 7/2020 | Li ..................... F21S 43/195 |
| 2021/0146841 A1 * | 5/2021 | Huizen ............... F21S 43/14 |

FOREIGN PATENT DOCUMENTS

| | | |
|---|---|---|
| EP | 3238993 A1 | 11/2017 |
| TW | 201507895 A | 3/2015 |

OTHER PUBLICATIONS

Lincoln Embrace https://www.youtube.com/watch?v=f5PekFN8p6k.
German Search Report issued in application No. DE102022202675.6, dated Feb. 10, 2023, 8 pages.

* cited by examiner

RGB LED SIGNAL LIGHTS

RELATED DISCLOSURES

This application is a continuation of U.S. patent application Ser. No. 17/325,428, filed May 20, 2021, the disclosure of which is hereby incorporated by reference in its entirety.

FIELD OF THE DISCLOSURE

The present disclosure relates to vehicle signal lights, and more specifically relates to color signal lights.

BACKGROUND

Vehicle signal lights have historically utilized incandescent bulb technology. With the advent of LED (light emitting diode) light sources, the ability to use colored LEDs to direct the color emitted even through a clear lens has enhanced the ability to incorporate color lights within an uncolored exterior. Taken one step further RGB (red, green, blue) LEDs enable any color in the color spectrum to be utilized given different scenarios. An example for automobiles are daytime running lights (DRL) and front signal lamps. One challenge here is that the light output and optics required can be quite different for different applications. For example, DRL and turn signal function use different sets of LEDs with unique optics for the different applications.

Different vehicle signal lights can have generally the same shape and/or lighting requirements but with different colors or color combinations. In the past this required different parts for each light with different lens colors to meet the different color requirements, or multiple adjacent lights with different colors to meet the different color requirements. Tracking, stocking and installing these similar but different lights can be costly and burdensome.

The opportunity presented by off road equipment is unique in that the equipment has different lighting scenarios and requirements for on-road and off-road applications. Off-road applications are typically less regulated from a compliance standpoint. The flexibility for off-road applications can allow the lighting development to focus the optics, color and other parameters for on road compliance, while also supporting different color and lighting options in the off-road environment.

It would be desirable to have vehicle signal lights that comply with on-road vehicle signal light requirements, and can be controlled to meet lighting requirements for various vehicle light positions, while also providing flexibility for lighting applications of the vehicle signal lights for the off-road environment.

SUMMARY

A vehicle lighting system is disclosed that includes a light fixture and a controller. The light fixture includes a plurality of light emitting diodes (LEDs) and a lens enclosing the plurality of LEDs, such that when any of the plurality of LEDs is activated the activated LED is visible through the lens of the light fixture. The controller is configured to control the plurality of LEDs. The controller monitors vehicle conditions and sends lighting commands to activate one or more LEDs of the plurality of LEDs based on the vehicle conditions. Each of the plurality of LEDs can be a red-green-blue (RGB) LED capable of emitting a plurality of different colors; and the lighting commands can include an illumination color from the plurality of different colors for the activated LEDs. The lens of the light fixture can be clear.

The controller can be coupled to the light fixture over a controller area network (CAN) bus; and the lighting commands can be sent by the controller to the light fixture over the CAN bus. The controller can be coupled to the light fixture over a local interconnect network (LIN) bus; and the lighting commands can be sent by the controller to the light fixture over the LIN bus. The controller can be coupled to the light fixture over a single power line; and the lighting commands can be sent by the controller to the light fixture over the single power line. The controller can be coupled to the light fixture wirelessly; and the lighting commands can be sent by the controller to the light fixture using any of various wireless protocols. The lighting commands can include the illumination color, an intensity level and an on/off command for each of the plurality of LEDs of the light fixture.

The plurality of LEDs can be arranged in contiguous groups, where each of the contiguous groups is separated from the other contiguous groups, and the lighting commands can include the illumination color for each of the contiguous groups. The lighting commands can include a blink/steady designation, wherein when the blink/steady designation for a particular group is a blink command then the particular group blinks in the illumination color for the particular group and, when the blink/steady designation for the particular group is a steady command then the particular group steadily lights in the illumination color for the particular group. The blink/steady designation can include a blink frequency and when the blink/steady designation for a particular group is the blink command then the particular group blinks in the illumination color for the particular group at the blink frequency. The lighting commands can include an intensity level; wherein when a particular group is activated then the particular group is illuminated in the illumination color for the particular group at the intensity level.

The lighting commands sent by the controller to activate the one or more LEDs can include a sequence of lighting commands configured to illuminate one or more LEDs in a desired order. Each of the sequence of lighting commands can include a blink/steady designation; where when the blink/steady designation is a blink command then the one or more LEDs blinks in the illumination color and, when the blink/steady designation is a steady command then the one or more LEDs steadily lights in the illumination color. Each of the sequence of lighting commands can include an intensity level; where when the one or more LEDs is activated then the one or more LEDs is illuminated in the illumination color at the intensity level.

The vehicle lighting system can include a plurality of light fixtures, where each light fixture includes a plurality of light emitting diodes (LEDs) and a lens enclosing the plurality of LEDs, such that when any of the LEDs of a particular fixture is activated the activated LED is visible through the lens of the particular light fixture. The controller is configured to control the LEDs of the plurality of light fixtures. The controller monitors vehicle conditions and sends lighting commands to activate one or more LEDs of the plurality of light fixtures based on the vehicle conditions. Each of the plurality of LEDs can be a red-green-blue (RGB) LED capable of emitting a plurality of different colors; and the lighting commands can include an illumination color from the plurality of different colors for the activated LEDs. The controller can send a sequence of lighting commands configured to illuminate one or more LEDs of multiple light fixtures in a desired order.

A light fixture for a vehicle is disclosed, where the light fixture includes a plurality of light emitting diodes (LEDs), a lens and an interface. Each of the LEDs is a red-green-blue RGB LED capable of emitting a plurality of different colors. The lens encloses the plurality of LEDs. The interface receives lighting commands. When any of the LEDs is activated the activated LED is visible through the lens of the light fixture. The lens can be clear.

The LEDs of the light fixture can be arranged in contiguous groups, where each contiguous group is separated from the other contiguous groups, and the lighting commands can include an active/inactive command and an illumination color for each contiguous group. When the associated active/inactive command for a particular group is active then the particular group is configured to illuminate in the associated illumination color, and when the associated active/inactive command is inactive then the particular group is configured to not illuminate. The lighting commands can include a blink/steady designation for each contiguous group; where when the associated blink/steady designation is a blink command then the particular group is configured to blink in the associated illumination color and, when the associated blink/steady designation is a steady command then the particular group is configured to steadily illuminate in the associated illumination color. The blink/steady designation can include a blink frequency and when the blink/steady designation for a particular group is the blink command then the particular group is configured to blink in the associated illumination color at the blink frequency. The lighting commands can include an intensity level for each contiguous group, where when a particular group is activated then the particular group is configured to illuminate in the illumination color for the particular group at the intensity level.

The lighting commands for the light fixture can include a sequence of lighting commands configured to illuminate one or more LEDs in a desired order. Each of the sequence of lighting commands can include an active/inactive command and an illumination color; where for each LED of the one or more LEDs, when the associated active/inactive command is active then the LED is configured to illuminate in the associated illumination color, and when the associated active/inactive command is inactive then the LED is configured to not illuminate.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Vehicle signal lights, even for off-road vehicles, are traditionally designed primarily to meet road legal lighting requirements. RGB (red, green, blue) LEDs (light emitting diodes) can be designed to meet road legal lighting requirements while also being designed to provide flexibility and added functionality for the off-road environment. As an example, a large row crop tractor typically has roof halo mounted amber warning lights used for hazard and signal function for the North American Market. These amber warning lights can be replaced with RGB LEDs that could be used to display any color requested in the color spectrum, including for example white light output to match adjacent work lamps to form a signature shape for styling to convey branding in dark applications where vehicle forms are less recognizable. The same roof halo signal lights could also be changed to red in color to indicate the vehicle is stopped or has some error on board. Flashing red could indicate that the implement being towed by the tractor is nearly empty and needs a seed tender in a planting environment. Green in color could be used to indicate working function of the vehicle or positive movement across the field. Any combination of full color spectrum along with the use of solid on or flash sequences can be used as a visual aid to the vehicle in a field working environment. These can be controlled and set by the operator in their given use case via use of onboard controls, for example a touch screen as depicted in FIG. 1.

The exemplary embodiments discussed herein to describe the present invention are primarily directed to a tractor configuration, however it is noted that the invention is applicable to any self-propelled or towed vehicles and implements across the agriculture, turf, construction, forestry, mining, commercial, and residential vehicle industries.

Figure 1:
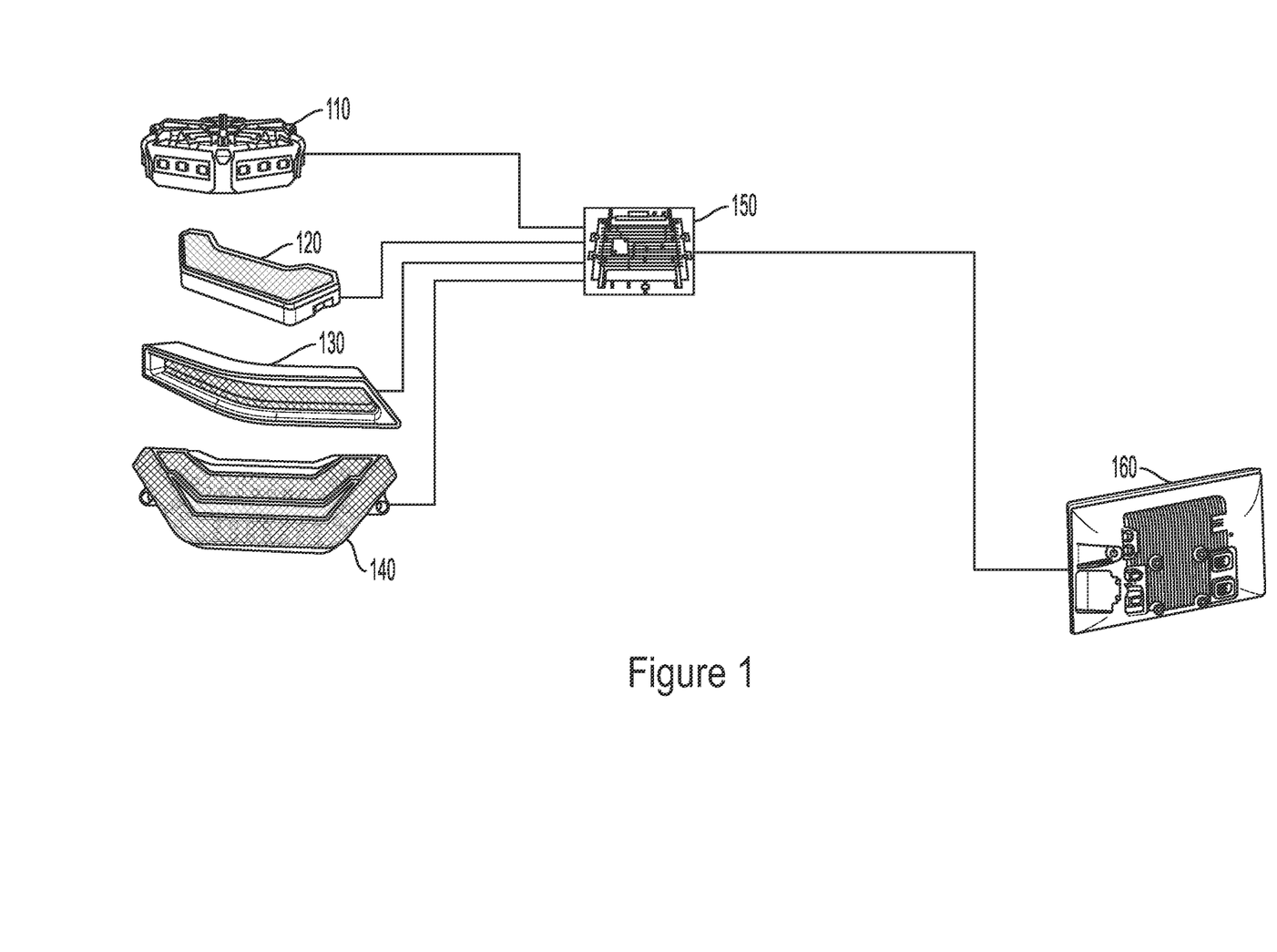
FIG. 1 illustrates an exemplary vehicle lighting system that includes various light fixtures coupled to a controller and an operator display.

FIG. 1 illustrates components of an exemplary vehicle lighting system. The exemplary lighting system includes various exemplary light fixtures including a roof light fixture 110, a warning light fixture 120, a side light fixture 130 and a tail light and rear signal fixture 140. The various light fixtures 110-140 shown, and possibly others, are coupled to a controller 150 which is coupled to an operator control 160. The operator control 160 can include mechanical or electronic switches, or for example a touch screen display. The connections of the vehicle lighting system can use any of various wired or wireless protocols, for example controller area network (CAN) bus, local interconnect network (LIN) bus, Ethernet, power-over-data-line (PoDL), Bluetooth, WiFi, etc.

Each of the various light fixtures 110-140 can be implemented using an LED array. Each LED in the array of a light fixture can be addressable, and can be controlled to be on/off, and to have a desired intensity, color and other parameters. The LED array of a light fixture can have various capabilities, for example 256 colors with multiple contrast settings, blinking, etc. Control of the LED array of a light fixture can be implemented in various different ways. Power can be provided by a single wire per function. Power and LIN, where LIN provides the commands for on/off and any of various lighting parameters. Power and CAN, where CAN provides the commands for on/off and any of various lighting parameters. Power and T1 Ethernet, where Ethernet provides the commands for on/off and any of various lighting parameters. Signal over power wire, where a single power wire is provided, but data is also communicated over the power wire thus providing the commands for on/off and any of various lighting parameters. Power and wireless control, where wireless connection provides the commands for on/off and any of various lighting parameters.

Figure 2:
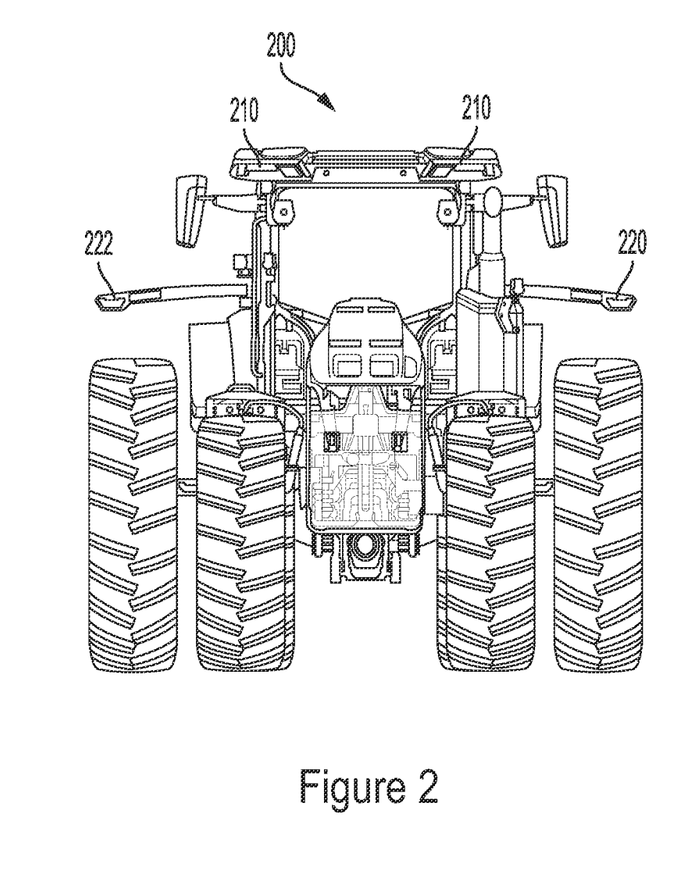
FIG. 2 illustrates a front view of an exemplary tractor in a North American configuration.
Figure 3:
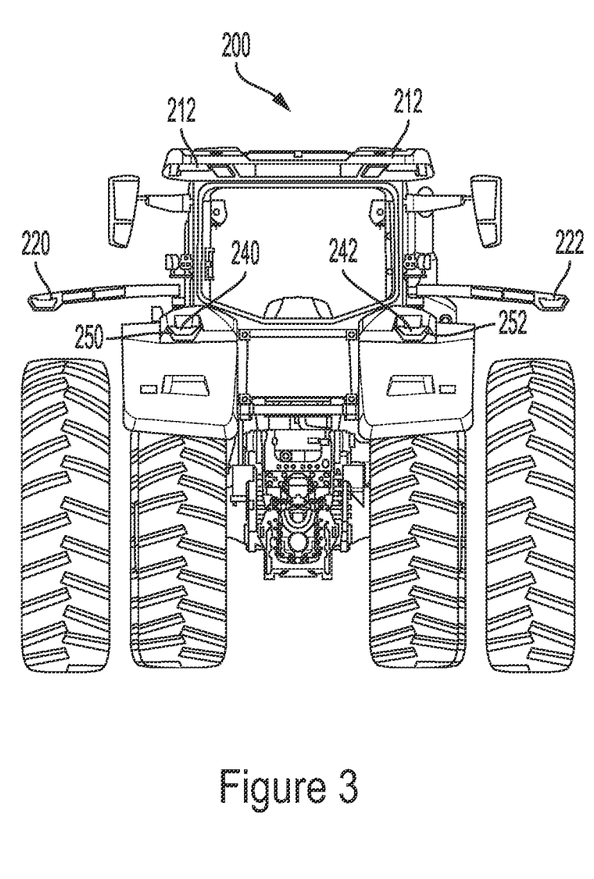
FIG. 3 illustrates a rear view of an exemplary tractor in a North American configuration.

FIGS. 2 and 3 illustrate front and rear views of a typical tractor 200 in a North American configuration. The front view of FIG. 2 shows forward warning lights 210 and left and right warning lights 220, 222. The rear view of FIG. 3 shows rearward warning lights 212, the left and right warning lights 220, 222, rear signal lights 240, 242 and tail lights 250, 252. The forward and rearward warning lights 210, 212 could each have a clear lens with LEDs mounted on the roof of the vehicle 200 where the LEDs can change colors depending on the situation. For example, the warning lights 210, 212 could default to amber, and switch to white for operator controlled field work, and switch to green when the tractor 200 enters autonomous operation in the field, and switch to other colors or color combinations for other situations. In the North American configuration warning lamps 220, 222 typically use single-color amber LEDs. Previously the rear signal lights 240, 242 and tail lights 250, 252 used separate lamps that shone through different colored amber (signal) and red (tail light) lenses. In some cases, this configuration used co-molded amber/red lens covers. With RGB LED light arrays, the left-side rear signal and tail lights 240, 250 can be combined and the right-side rear signal and tail lights 242, 252 can be combined. Each signal and tail light combination could have a molded clear lens and color-controlled LEDs that shine through in amber, red or both depending on the situation. With RGB LED arrays in the various lights, new colors and color combinations can be used to communicate more information than prior single color lights.

Figure 4:
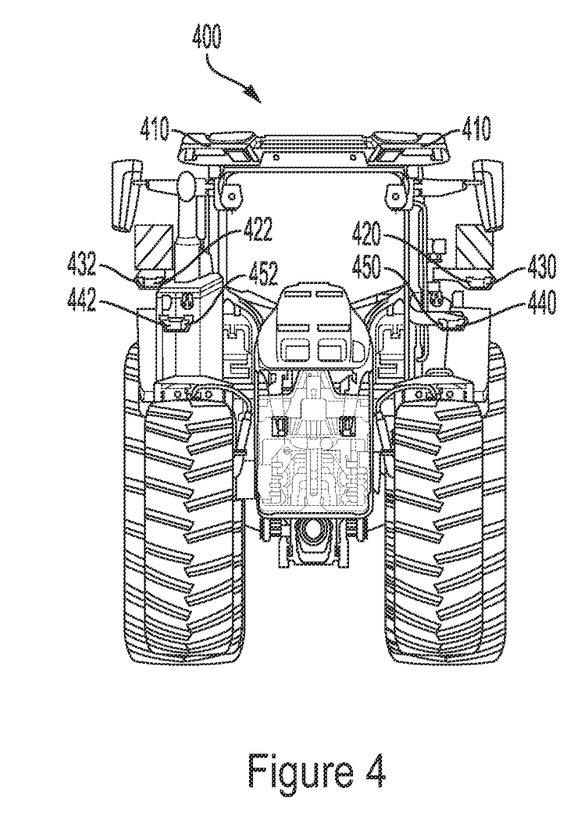
FIG. 4 illustrates a front view of an exemplary tractor in a European configuration.
Figure 5:
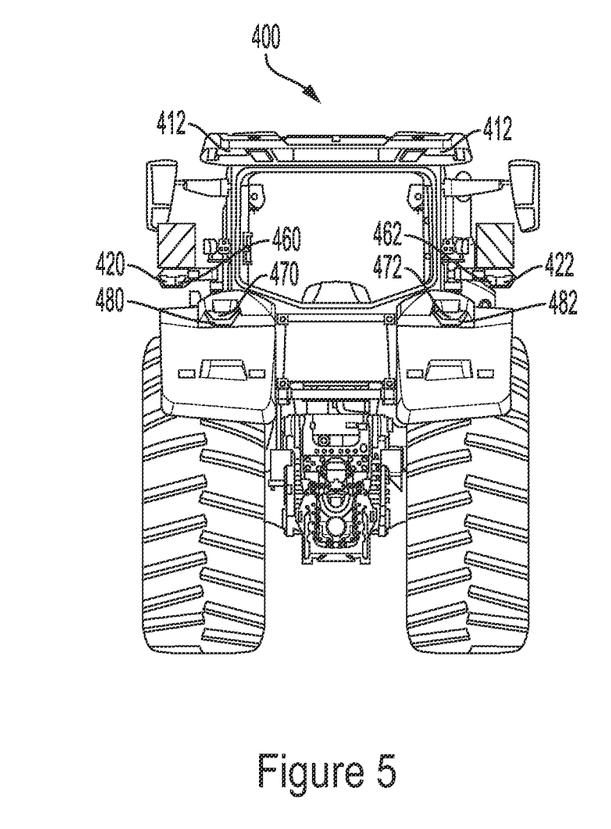
FIG. 5 illustrates a rear view of an exemplary tractor in a European configuration.

FIGS. 4 and 5 illustrate front and rear views of a typical tractor 400 in a European configuration. The front view of FIG. 4 shows forward roofline warning lights/turn indicators 410, side left and right warning lights 420, 422, front side position lights 430, 432, forward left and right warning lights 440, 442, and forward position lights 450, 452. The rear view of FIG. 5 shows rear roofline warning lights/turn indicators 412, the side left and right warning lights 420, 422, back side position lights 460, 462, rear left and right signal lights 470, 472, and tail lights 480, 482. The front and rear roofline warning lights/turn indicators 410, 412 could each have a clear lens with LEDs mounted on the roof of the vehicle 400 where the LEDs can default to amber, and switch to other colors to indicate different vehicle modes and situations. In the European configuration, note the white/amber adjacent or co-molded warning/position light pairs 420 and 430, 422 and 432, 440 and 450, 442 and 452. If these light pairs are replaced with an RGB LED array in combination with control logic then these turn signal/position light pairs could switch to entirely white when not turning, partially white and partially blinking amber when turning, green when the tractor enters autonomous operation within the field, and other desired color combinations. The rear-facing red/amber adjacent or co-molded warning/position light pairs 420 and 460, 422 and 462, 470 and 480, 472 and 482, if using RGB LED arrays in combination with control logic could use similar turn signal/position light combinations but with red or another color in place of white for the position lights. With RGB LED arrays in the various lights, new colors and color combinations can be used to communicate more information than prior single color lights.

Figure 6:
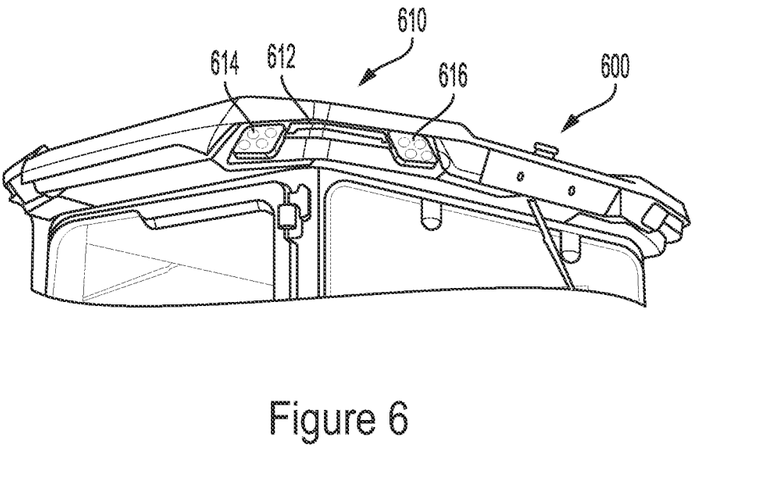
FIG. 6 illustrates exemplary RGB LED warning and beacon lights attached to the roof of a vehicle.

FIG. 6 illustrates an example of a beacon light 610 with a RGB LED array attached to the roof of a vehicle 600. The beacon light 610 includes a central portion 612, a right-hand portion 614 and a left-hand portion 616 (from the vehicle driver perspective). Each portion 612, 614, 616 of the RGB LED array of a beacon light 610 could independently, together, or otherwise switch to road legal amber warning lights when traveling on a roadway, switch to white in a work lamp situation, switch to green when the vehicle 600 enters autonomous operation, and switch to red indicating an error mode within autonomous operation. The right-hand portion 614 or the left-hand portion 616 could start to blink to indicate an upcoming turn in the designated direction, while the other portions of the RGB LED array of a beacon light 610 continue to indicate a desired condition. Alternatively, if a vehicle operator were actively completing a task and was only signaling to another vehicle in the field (for example a seed tender or fertilizer tender) that they will need a fill up, then the central portion 612 could change color to indicate the desired need while the right and left portions 614 and 616 can continue in field lighting mode so the task at hand can continue without losing nighttime work lighting. The central portion 612 could blink at varying frequencies/rates to indicate the urgency of the need. These and various other colors, color combinations, light intensities and other RGB LED array parameters can be controlled to provide desired signals and lighting.

Figure 7:
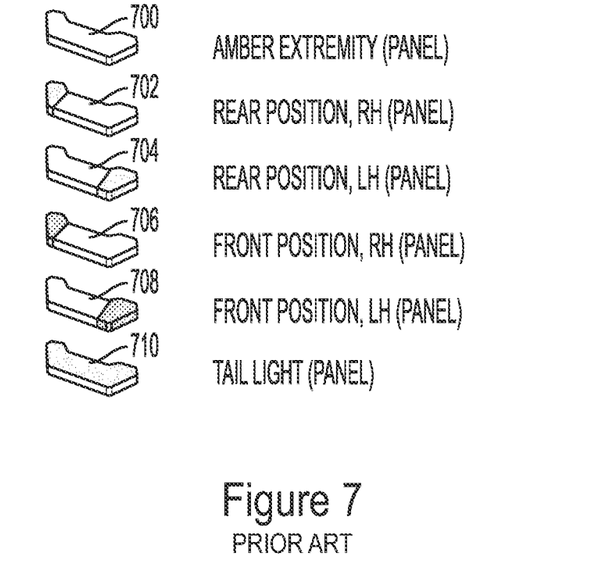
FIG. 7 illustrates various different lights with substantially the same perimeter shape that are used on one exemplary embodiment of a tractor.

FIG. 7 illustrates various different prior art lights 700-712 with substantially the same perimeter shape that are used on one exemplary embodiment of a tractor. The differences between the lights 700-710 is primarily the color of the lens, or light color emitted by each. In current implementations there are six different part numbers that have to be separately tracked, stocked and installed for these similar lights. By using lights with RGB LEDs these various parts could be significantly reduced. For example, the light fixture 800 shown in FIG. 8 with the same general perimeter shape and a clear lens could be used and the RGB LEDs of the light fixture 800 could be arranged so a left portion 810, a central portion 820 and a right portion 830 can be independently commanded to display different colors, color combinations and light intensities depending on the position/use of the light fixture. The light fixture 800 could be controlled to replace any of the various light fixtures 700-710 shown in FIG. 7, as well other lighting combinations.

Figure 8:
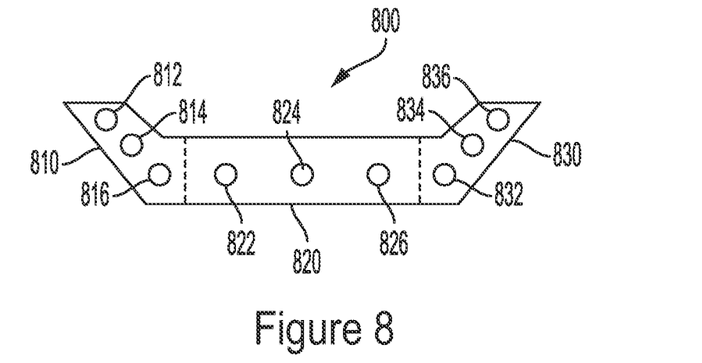
FIG. 8 illustrates a RGB LED light fixture with the same general shape as the various light fixtures of FIG. 7 but with a clear lens and where the RGB LEDs of the light fixture can be independently commanded to potentially replace one or more of the fixtures of FIG. 7 with a single light fixture.

The exemplary light fixture 800 includes the left portion 810 with a contiguous group of three RGB LED lights 812, 814, 816; the central portion 820 with a contiguous group of three RGB LED lights 822, 824, 826; and the right portion 830 with a contiguous group of three RGB LED lights 832, 834, 836. When functioning as an amber extremity light 700 then the light fixture 800 could be controlled so all of the LEDs of the left, central and right portions 810, 812, 814 light amber; and when functioning as a tail light 710 then the light fixture 800 could be controlled so all of the LEDs of the left, central and right portions 810, 812, 814 light red. When functioning as a right rear position light 702 then the light fixture 800 could be controlled so the LEDs 812, 814, 816 of the left portion 810 light red, while the LEDS 822, 824, 826 of the central portion 820 light amber, and the LEDs 832, 834, 836 of the right portion 830 light amber. When functioning as a left rear position light 704 then the light fixture 800 could be controlled so the LEDs 812, 814, 816 of the left portion 810 light amber, and the LEDS 822, 824, 826 of the central portion 820 light amber, while the LEDs 832, 834, 836 of the right portion 830 light red. When functioning as a right front position light 706 then the light fixture 800 could be controlled so the LEDs 812, 814, 816 of the left portion 810 light white, while the LEDS 822, 824, 826 of the central portion 820 light amber, and the LEDs 832, 834, 836 of the right portion 830 light amber. When functioning as a left front position light 708 then the light fixture 800 could be controlled so the LEDs 812, 814, 816 of the left portion 810 light amber, and the LEDS 822, 824, 826 of the central portion 820 light amber, while the LEDs 832, 834, 836 of the right portion 830 light white. Due to optics and control challenges, the list of lights in FIG. 7 might not be shrunk to one light fixture, but it could be significantly consolidated when considering added off-road options. There is potential to consolidate more and more light fixtures into one part-number that can be controlled to have variable power levels tied to specific colors.

Figure 9:
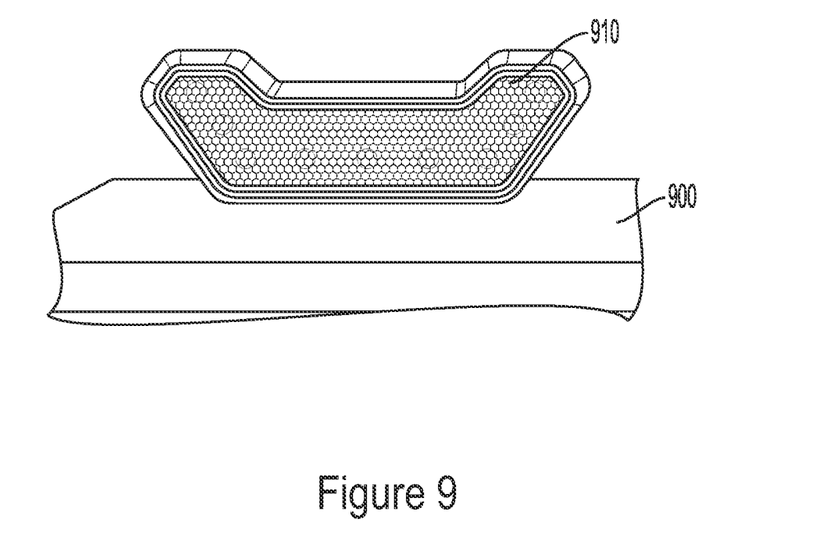
FIG. 9 illustrates an example of an off-road application of a RGB LED extremity light is illuminated green signifying an off-road mode is activated.

FIG. 9 illustrates an example of an added off-road application, where a RGB LED array of an extremity light 910 attached to a vehicle 900 is illuminated green signifying autonomous mode activated. The exemplary light fixture 800 can be used to indicate various on-road light signals, for example those shown in FIG. 7, and also to indicate various off-road light signals, for example that shown in FIG. 9. The light fixture 800 shown in FIG. 8 could be controlled to signify that autonomous mode is activated by commanding the LEDs of the left, central and right portions 810, 820, 830 all to light green. An extremity light using an RGB LED array can display various color and/or multi-color signals to indicate various conditions, whereas former single-color extremity lights require several one-off specific parts to indicate conditions with different colors.

The light fixture 800 can also be configured to indicate various on-road, off-road or other light signals by lighting the LEDs sequentially, individually or in groups to create signals or animations. For example, the LEDs could be controlled to light individually left to right by activating the LEDs 812, then 814, then 816, then 822, then 824, then 826, then 832, then 834, then 836. Alternatively, the LEDs could be controlled to light in groups of two left to right by activating the LEDs 812 and 814, then 816 and 822, then 824 and 826, then 832 and 834. Different size groups or different directions of sequential lighting could also be implemented as desired. The LEDs could be controlled to light individually or in groups to create animations, for example every other LED 814, 822, 826, 834 could blink on for a brief period, then when they go off the surrounding LEDs 812, 816, 824, 832, 836 blink on for the brief period, and the alternate blinking cycle can repeat. A blink/steady designation can be sent to command each LED or group of LEDs, where the blink/steady designation can be set to steady so when the LED is activated it remains steadily illuminated, or set to blink so when the LED is activated it blinks on and off. The blink designation can also include a frequency for the blinking of the LED. As is readily apparent, there are various options for lighting individual and groups of LEDs to create various unique signals or animations. These various signals be configured to illuminate the LEDs in one or more different colors to add to the variations.

Figure 10:
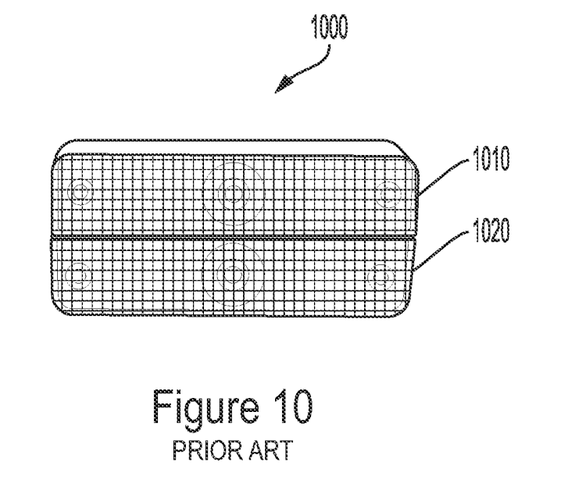
FIG. 10 illustrates an example of a prior art incandescent light fixture with an upper amber signal portion and a lower stop/tail light portion.

FIG. 10 illustrates an example of a prior art incandescent light fixture 1000 with an upper amber signal portion 1010 and a lower stop/tail light portion 1020. The optics for the bulb light sources of the light fixture 1000 are designed into the lens for the amber signal and the stop/tail light functions. Each region of the world has light standards specific to their area governing the intensity, location, and directional distribution of emitted light.

Figure 11:
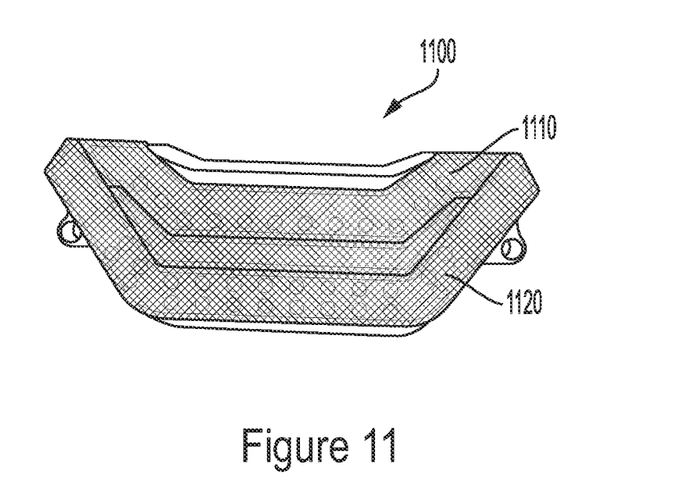
FIG. 11 illustrates an example of an LED light fixture with an upper portion and a lower portion that can be independently controlled.

FIG. 11 illustrates an example of an LED light fixture 1100 with an upper portion 1110 and a lower portion 1120. The lens for the upper and lower portions 1110, 1120 can each be clear or can each have any desired color for a particular application. For example, the upper portion 1110 can have an amber lens and the lower portion 1120 can have a red lens. The optics for the upper and lower portions 1110, 1120 can be the same or can each have any desired optical parameters for a particular application. The optics parameters for the LEDs can be molded into the surrounding material, in this case molded into the lens or casing that surrounds the LEDs of the LED light fixture 1100. The optics of the lens of the LED light fixture 1100 for each portion 1110, 1120 could be optimized to meet the legal regulations of the region governing intensity, directional distribution, etc. of the emitted light for that portion of the light fixture. Then the off-road and non-regulated uses of the light fixture can be added subject to the optic design of the primary legally regulated functions.

As an example of the versatility enabled by RGB LED lights, the LED light fixture 1100 when used as rear signal/tail lights 240/250, or 242/252 of FIG. 3 could enable more explicit vehicle signaling. When normally traveling in the forward direction, the rear signal light 240, 242 can illuminate amber and the tail lights 250, 252 could illuminate red. When the vehicle brakes are engaged, the intensity of the tail lights 250, 252 could be increased to indicate braking. When the vehicle is put in reverse to backup, the rear signal light 240, 242 could illuminate white to indicate reverse as is common in trucks and automobiles. When the vehicle is going to turn left, the left rear signal light 240 could blink amber while the right rear signal light 242 could remain steady amber. When the vehicle is going to turn right, the right rear signal light 242 could blink amber while the left rear signal light 240 could remain steady amber. This is just one example of the flexibility and added functionality enabled by RGB LED light fixtures without requiring additional components.

The various light fixtures of a vehicle could have multiple LEDs of different colors assembled into the light fixture and turned on via LIN, CAN, wireless or other control method including separate circuits with separate power lines. The primary function of the fixture could have the prime optical position, as in a flashing warning light, having the amber LED in the prime position, and then the other functions without legal regulations could use non-optimal optical positions for the LEDs of different colors like green or white.

A light fixture with a plurality of RGB LEDs, for example the fixture 900 or 1100, could be controlled or programmed to have different colors or color combinations, to have different brightnesses/intensities, to flash in different colors, to strobe, to perform sequential lighting (left-to-right, center-to-edge, etc.), to vary in brightness (dim-to-bright, bright-to-dim, etc.), make desired shapes or animations, or other variations and combinations thereof. The RGB LED light fixtures can have any desired shape (round, rectangular, triangular, polygonal, crescent, etc.), and can have various different arrangements of LEDs within the fixtures.

A lighting system with a plurality of light fixtures and a controller, where each of the light fixtures includes a plurality of light emitting diodes (LEDs) and a lens enclosing the plurality of LEDs. The controller can be configured to control the plurality of LEDs of the plurality of light fixtures, for example the light fixtures of FIGS. 2 and 3, or of FIGS. 4 and 5. The controller can monitor vehicle conditions, which can include monitoring operator commands, and send lighting commands to activate one or more LEDs of the plurality of light fixtures based on the vehicle conditions. The lighting commands sent by the controller can include a sequence of lighting commands configured to illuminate one or more LEDs of multiple light fixtures in a desired order or sequence. For example, the lighting commands could command a repeated sequence illuminating one or more LEDs of left warning light 220, followed by left side forward warning light 210, followed by right side forward warning light 210, followed by right warning light 222. As another example, the lighting commands could command a repeated sequence illuminating one or more LEDs of rearward warning lights 212, followed by left and right warning lights 220, 222, followed by rear signal lights 240, 242. The lighting commands could command the selected group of LEDs to have different colors or color combinations, to have different brightnesses/intensities, to flash at different rates, to strobe, or to have other desired parameters. The coordinated, sequential lighting (left-to-right, top-to-bottom, center-to-edge, etc.) across a plurality of light fixtures can enable design of shapes, animations, or other variations and combinations thereof.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A row crop tractor assembly for performing an agricultural operation in a field comprising:
    a row crop tractor configured to move across the field, the row crop tractor including a roof positioned above a cab for an operator and an operator control accessible by the operator;
    a controller coupled to the operator control and to a light fixture positioned on the roof of the row crop tractor;
    wherein the row crop tractor is configured to tow an associated implement to perform the agricultural operation;
    wherein the controller is configured to identify each condition of a plurality of conditions associated with the row crop tractor assembly, the plurality of conditions associated with the row crop tractor assembly including: that the row crop tractor assembly is operating in a field, and that the row crop tractor assembly is operating on a roadway;
    wherein the controller is configured to command a different operation of the light fixture in response to identification of each condition of the plurality of conditions associated with the row crop tractor assembly; and
    wherein the controller is configured to command the light fixture to emit amber light in response to identifying that the row crop tractor assembly is operating on a roadway and non-amber light in response to identifying that the row crop tractor assembly is operating in a field.

2. The row crop tractor assembly of claim 1, wherein the plurality of conditions associated with the row crop tractor assembly further includes: that the row crop tractor assembly is operating in an autonomous mode.

3. The row crop tractor assembly of claim 1,
    wherein the agricultural operation includes distributing material to the field; and
    wherein the plurality of conditions associated with the row crop tractor assembly further includes: that the associated implement contains less than a desired amount of the material that is to be distributed to the field.

4. The row crop tractor assembly of claim 3, wherein the material that is to be distributed to the field includes seed or fertilizer.

5. The row crop tractor assembly of claim 3, wherein the controller is configured to command the light fixture to cease emitting amber light and emit green light in response to identifying that the row crop tractor assembly is operating in the field.

6. The row crop tractor assembly of claim 5, wherein the controller is configured to command the light fixture to cease emitting green light and emit red light in response to identifying that the associated implement contains less than the desired amount of the material that is to be distributed to the field.

7. The row crop tractor assembly of claim 6, wherein the controller is configured to command the light fixture to emit red light in a blinking pattern in response to identifying that the associated implement contains less than the desired amount of the material that is to be distributed to the field.

8. The row crop tractor assembly of claim 7, wherein the blinking pattern includes a blink rate that is dependent on the amount of the material to be distributed to the field that is contained by the associated implement.

9. The row crop tractor assembly of claim 1, wherein the controller is configured to command the light fixture cease emitting amber light and emit white light forming a signature shape that conveys branding of the row crop tractor in response to identifying that the row crop tractor assembly is operating in the field.

10. The row crop tractor assembly of claim 1, wherein the lighting fixture includes a plurality of red-green-blue light emitting diodes;

wherein the plurality of red-green-blue light emitting diodes are arranged in a plurality of contiguous groups;

wherein the controller is configured to command a first operation from a first contiguous group of the plurality of contiguous groups in response to identification of a first condition of the plurality of conditions associated with the row crop tractor assembly; and wherein the controller is configured to command a second operation from a second contiguous group of the plurality of contiguous groups in response to identification of a second condition of the plurality of conditions associated with the row crop tractor assembly.

11. The row crop tractor assembly of claim 10, wherein the first operation is to emit steady light in a first non-amber color and the first identified condition is that the row crop tractor assembly is operating in the field.

12. The row crop tractor assembly of claim 11,
wherein the agricultural operation includes distributing material to the field;
wherein the plurality of conditions associated with the row crop tractor assembly further includes: that the associated implement contains less than a desired amount of the material that is to be distributed to the field; and
wherein the second operation is to emit blinking light in the first non-amber color and the second identified condition is that the associated implement contains less than the desired amount of the material that is to be distributed to the field.

13. The row crop tractor assembly of claim 12, wherein the emitted blinking light in the first non-amber color blinks at a blink rate that is dependent on the amount of the material that is contained by the associated implement.

14. The row crop tractor assembly of claim 11,
wherein the agricultural operation includes distributing material to the field;
wherein the plurality of conditions associated with the row crop tractor assembly further includes: that the associated implement contains less than a desired amount of the material that is to be distributed to the field; and
wherein the second operation is to emit light in a second non-amber color and the second identified condition is that the associated implement contains less than the desired amount of the material that is to be distributed to the field.

15. The row crop tractor assembly of claim 1, wherein the amber light is a road legal amber warning light required to be emitted when the row crop tractor assembly is traveling on the roadway.

16. A method of operating a row crop tractor assembly to perform an agricultural operation in a field, the method comprising:
moving the row crop tractor across the field to facilitate distribution of a material to the field,
determining, via a controller, that the row crop tractor assembly is operating in a field;
emitting non-amber light from a lighting fixture positioned on a roof of the row crop tractor in response to determining that the row crop tractor assembly is operating in the field;
determining, via the controller, that the row crop tractor assembly is operating on a roadway; and
ceasing to emit non-amber light and emitting amber light from the lighting fixture positioned on the roof of the row crop tractor in response to determining that the row crop tractor assembly is operating on the roadway.

17. The method of claim 16, further comprising:
determining, via the controller, while the row crop tractor assembly is moving across the field, that an amount of material available for distribution to the field is less than a desired amount of material; and
emitting light in a blinking pattern from the lighting fixture positioned on the roof the row crop tractor in response to determining that the amount of material available for distribution to the field is less than the desired amount of material.

18. The row crop tractor assembly of claim 16, wherein emitting non-amber light from the light fixture includes emitting non-amber light from a light emitting diode of the lighting fixture; and
wherein emitting amber light from the light fixture includes emitting amber light from the light emitting diode of the lighting fixture.

19. A row crop tractor assembly for performing an agricultural operation in a field comprising:
a row crop tractor configured to move across the field to facilitate distribution of a material to the field to perform the agricultural operation, the row crop tractor including a roof positioned above a cab for an operator and an operator control accessible by the operator;
a controller coupled to the operator control and to a light fixture positioned on the roof of the row crop tractor;
wherein the controller is configured to identify each condition of a plurality of conditions associated with the row crop tractor assembly, the plurality of conditions associated with the row crop tractor assembly including: that the row crop tractor assembly is operating in a field, that the row crop tractor assembly is operating on a roadway, and that an amount of material available for distribution to the field is less than a desired amount of material;
wherein the controller is configured to command a different operation of the light fixture in response to identification of each of the plurality of conditions associated with the row crop tractor assembly; and
wherein the controller is configured to command the light fixture to emit non-amber light from a light emitting diode of the light fixture in response to identifying that the row crop tractor assembly is operating in a field and emit amber light from the light emitting diode of the light fixture in response to identifying that the row crop tractor assembly is operating on a roadway.

20. The row crop tractor assembly of claim 19, wherein the amber light is a road legal amber warning light required to be emitted when the row crop tractor assembly is traveling on a roadway.

* * * * *